US012390828B2

(12) United States Patent
Robinson

(10) Patent No.: US 12,390,828 B2
(45) Date of Patent: Aug. 19, 2025

(54) DOOR PAINTING AND DRYING ASSEMBLY

(71) Applicant: Kyle Robinson, Menlo Park, CA (US)

(72) Inventor: Kyle Robinson, Menlo Park, CA (US)

(*) Notice: Subject to any disclaimer, the term of this patent is extended or adjusted under 35 U.S.C. 154(b) by 471 days.

(21) Appl. No.: 18/083,530

(22) Filed: Dec. 18, 2022

(65) Prior Publication Data

US 2023/0123316 A1 Apr. 20, 2023

(51) Int. Cl.
*B05C 13/02* (2006.01)
*B05C 5/02* (2006.01)

(52) U.S. Cl.
CPC ................ *B05C 13/02* (2013.01); *B05C 5/02* (2013.01)

(58) Field of Classification Search
None
See application file for complete search history.

(56) References Cited

U.S. PATENT DOCUMENTS 1,750,807 A * 3/1930 Lichtman ............... C25D 17/08 211/124
1,937,439 A * 11/1933 Schacht .................... B05C 9/08 118/500
2,258,391 A * 10/1941 Novitsky ............... C25D 17/08 204/297.1
2,512,554 A * 6/1950 Schneider .............. C25D 17/08 204/297.09
2,858,265 A * 10/1958 Max ....................... C25D 17/08 204/297.09
2,904,492 A * 9/1959 Hans ....................... C25D 17/06 248/302
3,029,952 A * 4/1962 Bagdon .................. B65G 17/20 211/117
3,294,668 A * 12/1966 Linquist ..................... C09C 3/08 204/297.1
3,357,913 A * 12/1967 Zavarella ............... C25D 17/08 204/297.06
3,981,471 A * 9/1976 Currier ................ B65G 17/323 294/93
4,033,288 A * 7/1977 Woellhaf ................ B05C 11/08 118/316
4,115,083 A * 9/1978 Huppi ........................ B03C 3/86 96/93
4,128,078 A * 12/1978 Stoltz .................... B05B 7/1404 118/316
4,181,553 A * 1/1980 Hogg ....................... A47G 1/17 156/247

(Continued)

*Primary Examiner* — Jethro M. Pence

(57) ABSTRACT

Presented is a door painting and drying assembly configured to hold an unfinished door for finishing by a single painter. The assembly includes an inner rim having a first rim member and a second rim member oriented perpendicular to one another, an outer rim consisting of a third rim member, and a fourth rim member oriented perpendicular to one another. The outer rim is rotatably configured over the inner rim such that the outer rim remains concentric with the inner rim during rotation. The assembly includes a beam attached across the fourth rim member, a sliding member slidably configurable on the beam. The sliding member includes slots for receiving a door support member to support a base portion of an unfinished door. The assembly further includes a vertical door support with a bracket adjustably mounted thereto to clamp to a mount attached on a hanging stile of the unfinished door.

20 Claims, 11 Drawing Sheets

(56) References Cited

U.S. PATENT DOCUMENTS 4,213,418 A * 7/1980 Oswald .................. B05B 5/082 248/312.1
4,217,853 A * 8/1980 Davitz .................. B05B 5/082 204/297.09
4,527,694 A * 7/1985 Bolt .................. B42F 15/0094 211/162
4,605,988 A * 8/1986 Nienhuis .................. H05F 3/02 361/829
4,628,859 A * 12/1986 Hines .................. B05B 5/082 118/500
4,773,172 A * 9/1988 Fast .................. A47F 5/0838 248/222.12
4,872,963 A * 10/1989 Van Horn .............. C25D 17/08 118/503
5,908,120 A * 6/1999 Yates .................. B05B 5/082 118/500
6,699,327 B2 * 3/2004 VanRossen ............. B05B 12/20 118/504
7,022,189 B2 * 4/2006 Delle Vedove ......... B05B 14/30 118/504
7,105,057 B1 * 9/2006 Colussi .................. B05B 12/29 118/504
9,016,664 B1 * 4/2015 Powers ............... B05B 13/0285 254/8 R
9,302,288 B2 * 4/2016 Waterston ................ B25H 1/06
10,934,766 B2 * 3/2021 Gouge ...................... E06B 3/56
11,203,036 B1 * 12/2021 Lin ......................... B05C 13/02
11,484,902 B2 * 11/2022 Ahn ....................... A43D 95/06
11,583,888 B2 * 2/2023 Green ........................ B05C 3/02
12,103,028 B2 * 10/2024 Buckel, Jr. .......... B05C 17/0217
2012/0273439 A1 * 11/2012 Beavers ................. C25D 17/08 211/26
2023/0286014 A1 * 9/2023 Vieluf ..................... C23C 14/00

* cited by examiner

DOOR PAINTING AND DRYING ASSEMBLY

TECHNICAL FIELD OF INVENTION

The present invention relates to door painting, staining, finishing, and drying devices, and more particularly the present invention relates to a new door painting and drying assembly for mounting the door thereon such that the door may be rotated to facilitate painting the door then moving the freshly painted door to a drying area.

BACKGROUND

Painting or finishing new doors, and refinishing existing doors, requires time-consuming labor and enough space to accommodate both the painting and drying processes.

Typically, this work involves activities related to preparing or masking off the room where the painting will be done, then standing the doors up by attaching them to each other at the top. In this method, the painter will then navigate the room while painting each door, being careful not to touch freshly painted doors with the spray gun hose or to overspray a surface onto a neighboring door. This often requires a large amount of space and a lot of preparation. In another common method, brackets are attached to the top and bottom of the door and the door is placed between two sawhorses. The painter will then walk around the door while painting and when done, will then flip the door to paint the opposite side. Once fully painted, the door is then lifted and stacked on another door separated by the width of the bracket. Issues arising from this method are that it requires a co-worker to flip and to stack the doors, and that the doors must be the same height in order to stack.

In the past, door painting racks have been proposed wherein the door is hung from a rack and is completely finished/painted while held within the rack. While such racks work with varying degrees of efficiency, they tend to suffer from one or more drawbacks. Many such door painting racks are complex in design and construction, making these racks expensive to manufacture and time-consuming to assemble and use. Most of these door painting racks are designed to hold the doors in a horizontal position as disclosed in US20150283574. U.S. Pat. Nos. 8,066,267, 4,491,308.

Another problem of significance is that freshly painted doors should be allowed to dry in a location removed from the painting rack. Moving a freshly painted door is difficult and most often requires two workers.

Solutions presented for door painting disclosed in U.S. Pat. Nos. 6,702,130, 8,707,976, and 6,338,758 which help in placing the door in a vertical position, suffer from numerous limitations such as design complexity, requiring a lot of human effort in handling doors on the rack, and so on. Usually, such racks require multiple user operations in order to paint the door.

None of the prior art offers the functionality, flexibility of use, and simplicity in design as is presented herein by the inventor.

SUMMARY

In brief, it is an object of the present invention to provide a door painting and drying assembly that allows a door to be mounted thereon with ease such that the door may be rotated by a single painter and painted from a single position. Once painted, the assembly also allows a freshly painted door to be removed from the painting assembly for drying separately. The assembly is also capable of allowing the freshly painted door to dry on the assembly without the necessity to remove it.

It is another object of the present invention to provide a door painting and drying assembly that is portable and can be easily assembled and disassembled.

Another object of the present invention is to provide a door painting and drying assembly that requires minimal space for installation and use compared to door painting racks available in the prior art.

Another object of the present invention is to provide a door painting and drying assembly that requires comparatively less handling of the door from a painter.

It is another object of the present invention to provide a door painting and drying assembly that can be operated by a single person.

It is another object of the present invention to provide a door painting and drying assembly that can work with varying door sizes (varying in height and width) and thicknesses.

It is another object of the present invention to provide a door painting and drying assembly that uses paint shields for overspray protection of the assembly and the door, while the door is painted.

Embodiments of the present invention disclose a door painting and drying assembly comprising a base structure comprising an inner rim having a first rim member and a second rim member oriented perpendicular to the first rim member; an outer rim having a third rim member and a fourth rim member oriented perpendicular to the third rim member; wherein the outer rim is rotatably configured over the inner rim such that the outer rim remains concentric with the inner rim during rotation.

In an embodiment, the door painting and drying assembly further includes a beam attached across the fourth rim member, and a sliding member slidably configurable on the beam, the sliding member comprising at least two slots for receiving a door support member there inside, wherein the door support member supports a base portion of an unfinished door.

In an embodiment, the door painting and drying assembly further includes a vertical door support with at least one bracket adjustably mounted thereto. The bracket is configured to clamp to a mount attached to a hanging stile of the unfinished door, wherein the mount is attached for ease of mounting and dismounting the unfinished door (200) to and from the assembly.

These and other features and advantages along with other embodiments of the present invention will become apparent from the detailed description below, in light of the accompanying drawings.

DETAILED DESCRIPTION

Figure 1:
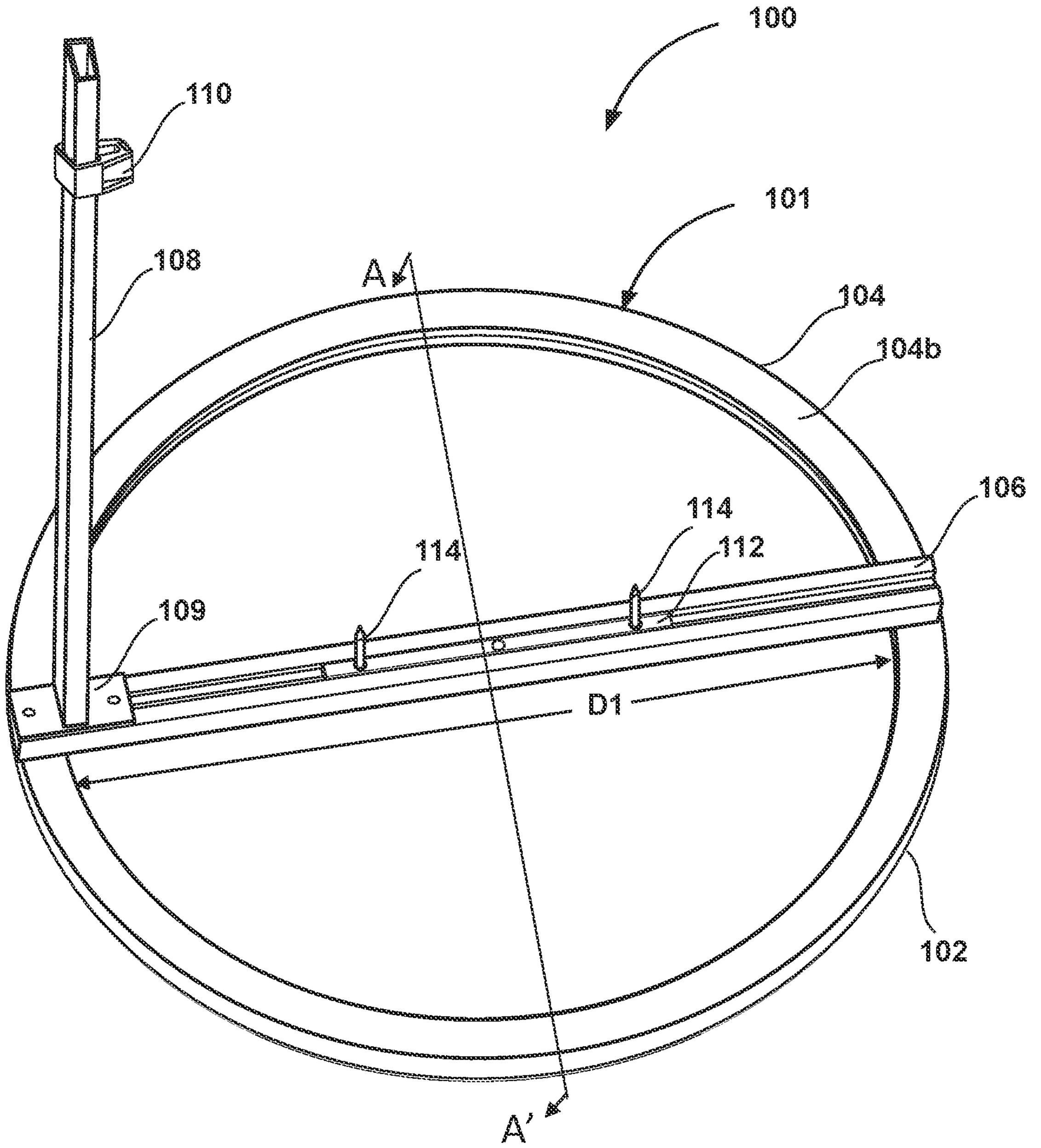
FIG. 1 is an assembled view of a door painting and drying assembly according to an embodiment of the disclosure.

Some embodiments, illustrating its features, will now be discussed in detail. The words "comprising," "having," "containing," "including," "consisting," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments in description and drawings are merely exemplary.

References to "one embodiment", "an embodiment", "another embodiment", "an example", "another example", "some embodiment", "yet another embodiment", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. Unless stated otherwise, terms such as "first", "second", "third", are used to arbitrarily distinguish between the elements such terms describe. Thus, these terms are not necessarily intended to indicate temporal or other prioritization of such elements.

Before describing the present invention in detail, it should be observed that the present invention relates to a door painting and drying assembly. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting but as a representative basis for teaching one skilled in the art to variously employ the present invention in virtually any appropriately detailed structure. Further, the terms and phrases used herein are not intended to be limiting but rather to provide an understandable description of the invention. For the purpose of this application, "finished door", "unfinished door", or "door", all of these terms are interchangeably used and in the description, if it is mentioned, "the door", it may be unfinished/unpainted door or finished/painted door.

Referring to drawings, and in particular to FIGS. 1 through 5 thereof, a novel door painting and drying assembly embodying the principles and concepts of an embodiment of the invention designated by the reference numeral 100 will now be described. The door painting and drying assembly 100 includes a base structure 101 configured to be rested on a surface such as a floor. The base structure 101 includes an inner rim 102 and an outer rim 104.

As seen, the inner rim 102 includes a first rim member **102*a* and a second rim member 102*b*. The rim members 102*a*, and 102*b* are oriented perpendicular (90 degrees) to one another. In an embodiment, the rim members 102*a*, and 102*b* may be made of a single metal sheet that may then be folded along a fold line (FL) to form the rim members 102*a* and 102*b*. In some other embodiment, two separate rim members 102*a*, and 102*b* may be formed using thin metal sheets and then they may be conjoined at 90 degrees using known techniques such as welding. Further, as seen in FIGS. 2-3, a plurality of fastener openings 102*e* are formed and located on the second rim member 102*b*, and a plurality of fastener openings 102*f* are formed and located on the first rim member 102*a***.

As seen, the inner rim 102 includes a plurality of rollers **102*c*, each of which is capable of freely rotating along its rotational axis. In an embodiment, each of the rollers 102*c* is configured on an interior surface of the rim member 102*b* using a fastener 102*h*, and a locking pin 102*g*. During assembly, each of the fasteners 102*h* extends through the rollers 102*c* (via a central opening (not seen) provided in the rollers 102*c*) and through the fastener openings 102*e* located on the interior surface of the rim member 102*b* to rotatably lock the rollers 102*c* using the locking pins 102*g*. The rollers 102*c* as used are of a height substantially the same as that of the rim member 102*b* such that when assembled on the interior surface of the rim member 102*b*, the roller 102*c* is in contact with the rim member 102*a* and a rim member 104*b* of the outer rim 104. The rollers 102*c* are strategically chosen to be in contact with the rim members 102*a*, and 104*b* to facilitate the outer rim 104 to rotate with respect to the inner rim 102 when the outer rim 104 is mounted over the inner rim 102**.

Figure 2:
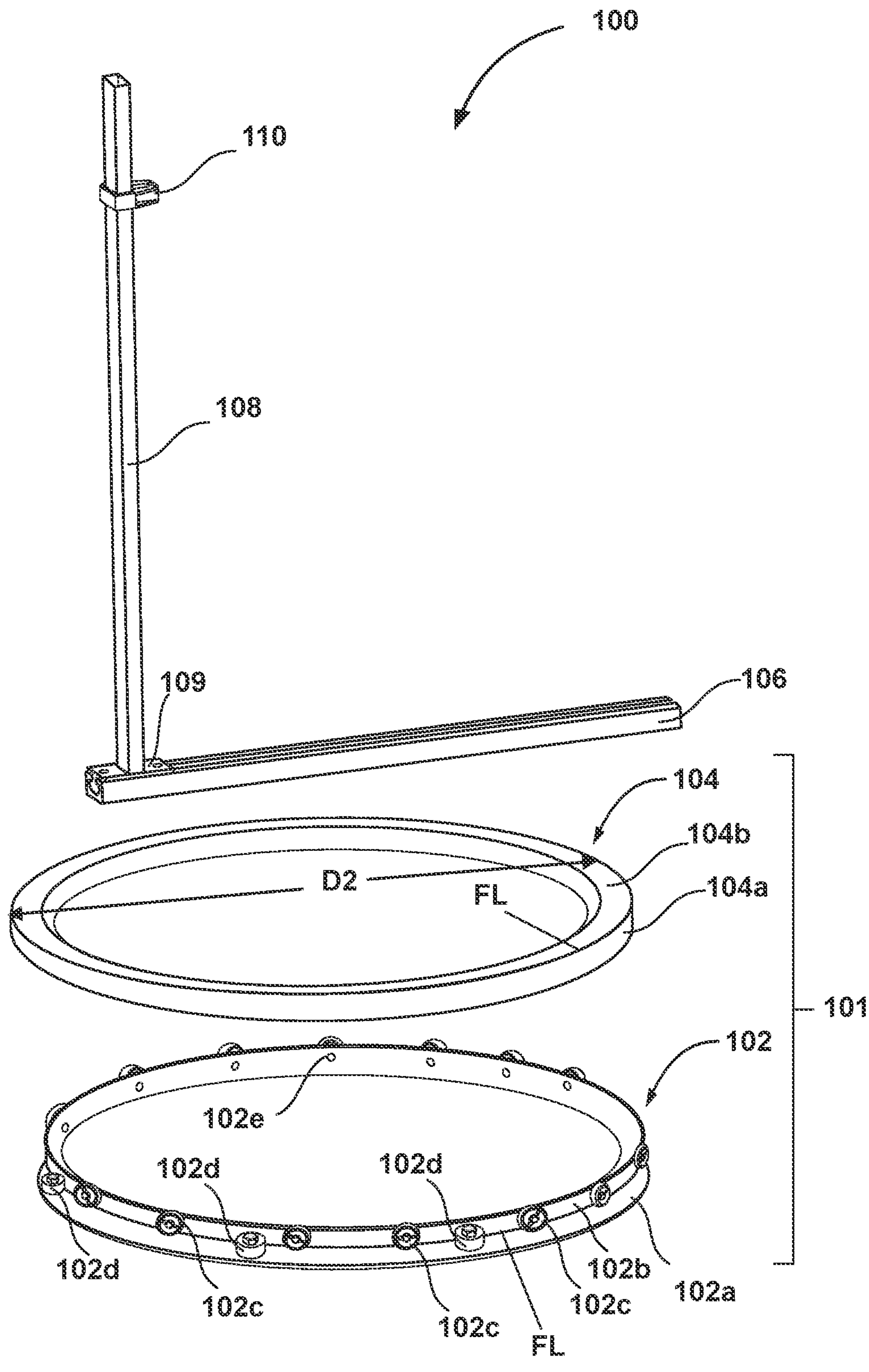
FIGS. 2-3 are exploded views of the door painting and drying assembly of FIG. 1.
Figure 3:
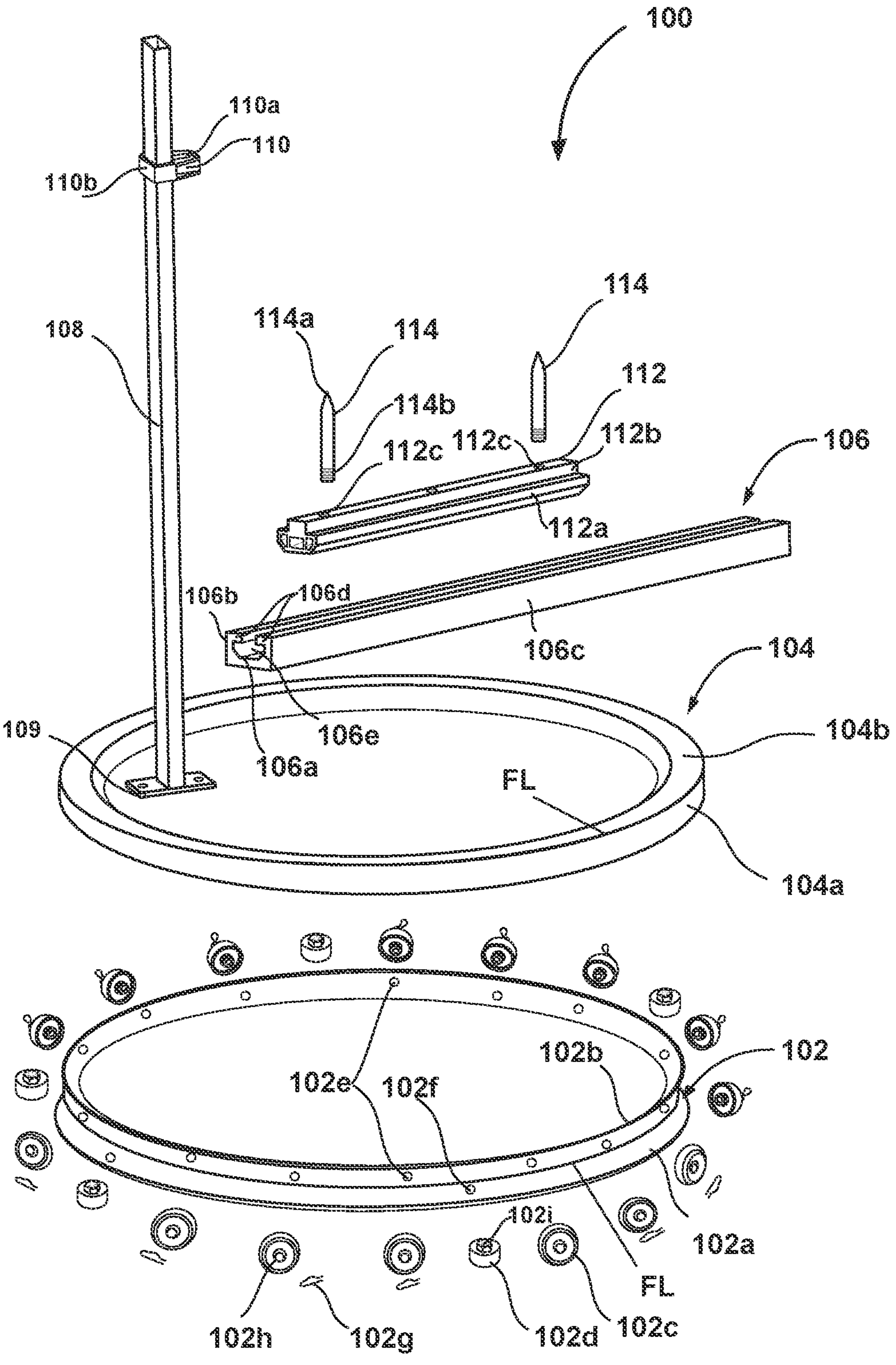

As seen in FIGS. 2-3, the inner rim 102 includes a plurality of spacers **102*d* configured on the rim member 102*a* of the inner rim 102. The spacers 102*d* facilitate in keeping the outer rim 104 concentric with the inner rim 102 during rotation of the outer rim 104. The spacers 102*d* are configured on the rim member 102*a* using fasteners 102*i* that extend through the spacers 102*d* and fastener openings 102*f*. In an embodiment, the spacers 102*d*** are cylindrically shaped.

As stated, the base structure 101 includes the outer rim 104. The outer rim 104 includes a third rim member **104*a* and a fourth rim member 104*b*. In an embodiment, the rim members 104,104*b* are oriented perpendicular (90 degrees) to one another. In an embodiment, the rim members 104*a*, and 104*b* may be made of a single metal sheet that may then be folded along a fold line (FL) to form the rim members 104*a*, and 104*b* as seen. In some other embodiment, two separate rim members 104*a*, and 104*b* may be formed using a thin metal sheet and then they may be conjoined at 90 degrees using known techniques such as welding. The outer rim 104 is essentially the same in structure as that of the inner rim 102 except lacking the fastener openings 102***e*, and 102*f* located on the inner rim 102 as discussed above.

Figure 4:
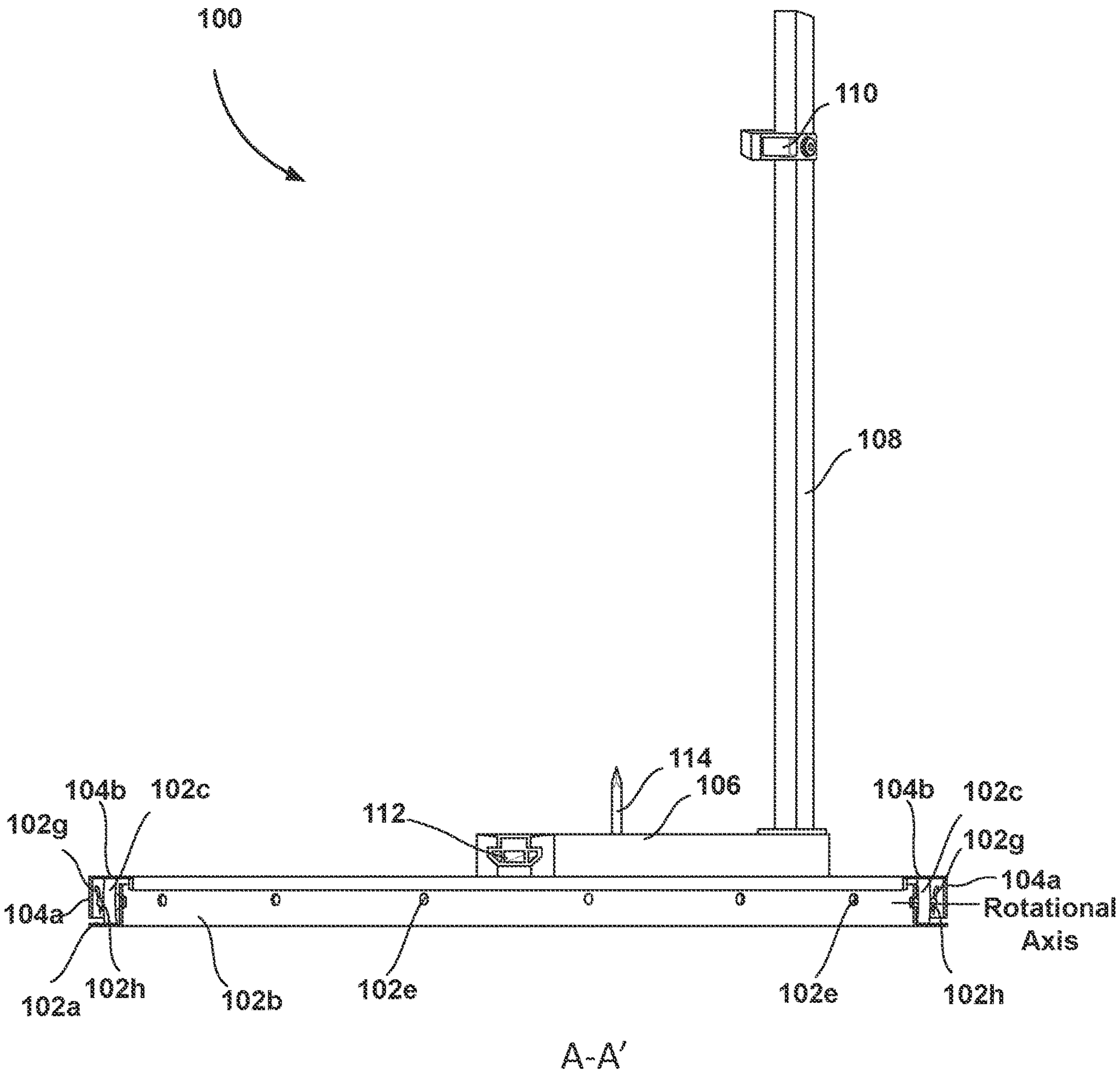
FIG. 4 is a cross-sectional view of the door painting and drying assembly of FIG. 1 taken along A-A'.
Figure 5:
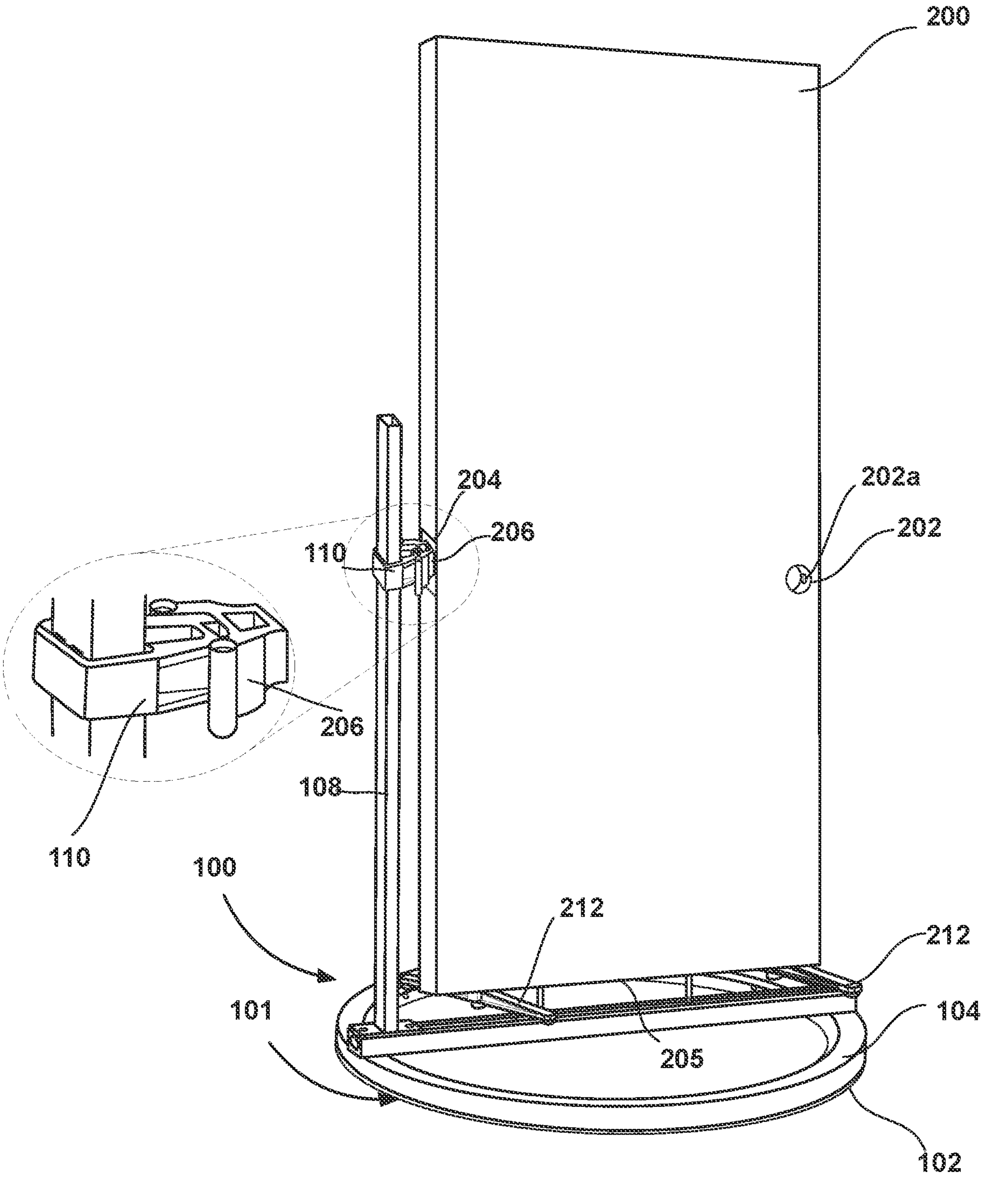
FIG. 5 is an in-use view of the door painting and drying assembly with an unpainted door held on the assembly.

In an assembled configuration, the underside of the outer rim 104 is in contact with the rollers 102*c* configured on the inner rim 102. In operation, as may be understood from FIG. 6, a painter 300 puts his leg on the outer rim 104 and rotates it using the leg, the outer rim 104 starts rotating because of the rollers 102*c* rolling along their rotational axis. The outer rim 104 rotates and always remains concentric with respect to the inner rim 102 due to the presence of nylon spacers 102*c* mounted on the rim member 102*a* of the inner rim 102. The nylon spacers 102 ensures that the rim member 104*a* remains spaced apart from the rim member 102*b* and the rim member 104*a* of the outer ring 104 does not try to shift towards the rim member 102*b* of the inner rim 102. Although FIG. 6 suggests rotation of the outer rim 104 in a clockwise direction (as indicated by arrows). It should be understood that the outer rim 104 may be rotated in a clockwise or anticlockwise direction or a combination thereof. The outer rim 104 when configured over the inner rim 102 forms a square cross-section or a rectangular cross-section as seen in FIG. 4.

Referring to FIGS. 1-3, the assembly further includes a beam 106 attached across the rim member 104*b* of the outer rim 104. In a preferred embodiment, the beam 106 is made equal in length to the outer diameter D2 of the base structure 101. In another embodiment, the beam 106 is made greater in length than the inner diameter D1 of the base structure 101. In an embodiment, the beam 106 is fixedly attached to the outer rim (particularly over the rim member 104*b*). For example, the beam 106 may be welded on a top surface of the rim member 104*b* of the outer rim 104. In another embodiment, the beam 106 may be removably fixed the rim member 104*b* of the outer rim 104 using some fasteners. As seen in FIG. 3, the beam 106 includes a base 106*a*, a first side wall 106*b*, and a second side wall 106*c* extending upwardly from the base 106*a*. The base 106*a*, and the side walls 106*b*, 106*c* extend longitudinally to form a channel 106*e* for receiving a sliding member 112 therein. The side walls 106*b*,106*c* include an inwardly protruding extension 106*d*. The inward protruding extension 106*d* functions to retain the sliding member 112 inside the channel and allows to slidingly insert and move the sliding member 112 within the channel 106*e*. The beam 106 further comprises an opening on either side of the channel 106*e*.

Referring to FIGS. 1-4, the assembly further includes the sliding member 112 that's slidably configured within the channel 106*e* of the beam 106. The sliding member 112 includes at least two slots 112*c*. In an embodiment, the slots 112*c* are threaded slots. Although three slots 112*c* are shown configured on the sliding member 112, it should be understood that two or more than two slots may be present on the sliding member 112. These slots 112*c* are for receiving a door support member 114. The door support member 114 includes a threaded end 114*b* that is received inside the slots 112*c*. The door support member 114 also includes a pointed tip 114*a* to support a base portion 205 of an unfinished door 200. The sliding member 112 includes a base portion 112*a*, and a top portion 112*b*. The top portion 112*b* extends upward from the base portion 112*a*. The base portion 112*a* is made substantially similar in cross-section and size to that of the channel 106*e* of the beam 106 to allow fitment and movement to the sliding member 112 within the channel 106*e*.

Referring to FIGS. 1-3, 5, and 12, the assembly further includes a vertical door support 108 with at least one bracket 110 adjustably mounted onto the vertical door support 108. The vertical door support 108 may be a single unitary element. In another embodiment, the vertical door support 108 may consist of two or more pieces connectable to one another. The vertical door support 108 is removably or fixedly mounted onto the beam 106 using a mounting plate 109 located at the bottom of the vertical door support 108. The vertical door support 108 is mounted at an extreme end of the beam 106 as shown in FIG. 1. Although the vertical door support 108 is shown mounted onto the left extreme end of the beam 106, it should be understood that it can be mounted on the right extreme end of the beam 106.

The bracket 110 mounted on the vertical door support 108 clamps to a mount 206 attached to a hanging stile of the unfinished door 200. The mount 206 is attached to the hanging stile of the door 200 for ease of mounting and dismounting of the unfinished door to and from the assembly 100. The bracket 110 can be adjusted to slide upward or downward along the vertical door support 108 to clamp onto the mount 206 attached to the door 200 to make the invention work for a variety of doors varying in sizes. As seen, the bracket 110 includes a head portion 110*a* that's substantially V-shaped, and a tail portion 110*b* that adjustably connects to the vertical door support 108. The head portion 110*a* is attachable to the mount 206, specifically attached within a V shaped cavity 206*e* of the mount 206. In an embodiment, the bracket 110 is attached into the V shaped cavity 206*e* using a fastener. In some other embodiment, the attachment may be by means of snap fit. The V-shaped cavity 206*e* of the mount 206 is formed by a pair of side supports 206*c*,206*d* extending from an attaching portion 206*a*. The mount 206 is attached to the hanging stile of the door 200 through a front surface 206*b* of the attaching portion 206*a*.

Referring to FIGS. 7-11, the assembly 100 further includes a first hand tool 208. The first hand tool 208 includes a body portion 208*a*, a tip 208*b* protruding from one end of the body portion 208*a*, and a hand grip portion 208*c* extending from another end of the body portion 208*a*. The protruding tip 208*b* and/or the body portion 208*a* of the hand tool 108 is insertable within a hole 202*a* (that leads into an opening 202 for a lever handle (not seen)) located on a closing stile of the unfinished door 200 to facilitate mounting and dismounting of the finished or unfinished door 200 to and from the assembly 100. Depending upon the size of the opening 202 made for the lever handle on the door 200, one can insert just the tip 208*b* portion or the tip portion 208*b* and the body portion 208*a* (partially or fully) of the tool 208 within the hole 202*a* for removal or lifting of the door 200 form the assembly. The body portion 208*a*, and the tip 208*b* are made substantially lesser in diameter compared to the hole 202*a*.

The door painting and drying assembly 100 of the present invention also uses a second hand tool 210. The hand tool 210 includes a body portion 210*a*, a hand grip portion 210*b* extending from one end of the body portion 210*a*, and a base plate 210*c* attached to another end of the body portion 210*a*. The base plate 210*c* includes a V shaped member 210*d*, and a vertical member 210*e* configured thereon and extends in an upward direction therefrom. In operation, the vertical member 210*e* of the tool 210 is insertable within an elongated hole 206*f* formed at a free end of each of the pair of side supports 206*c*,206*d* of the mount 206 to facilitate mounting and dismounting of the finished or unfinished door 200 to and from the assembly 100.

The door painting and drying assembly 100 of the present invention further includes or uses a footrest 212. The footrest 212 consists of a first arm 212*a*, and a second arm 212*b*. The arms 212*a* and 212*b* extend from a pivotal portion 212*c* of the footrest 212. The arms 210*a* and 212*b* are slightly slanted in configuration. The footrest 212 also consists of a plurality of rubber pads 212*d* attached underside the arms 212*a*, 212*b*, and/or the pivotal portion 212*c*. The rubber pads 212*d* may be attached using glue or fasteners etc. The footrest 212 is attachable to the base portion 205 of the unfinished or finished door 200 to facilitate the door 200 to stand on a ground surface or floor or to allow the doors 200 to get stacked for drying or storage purposes.

Figure 6:
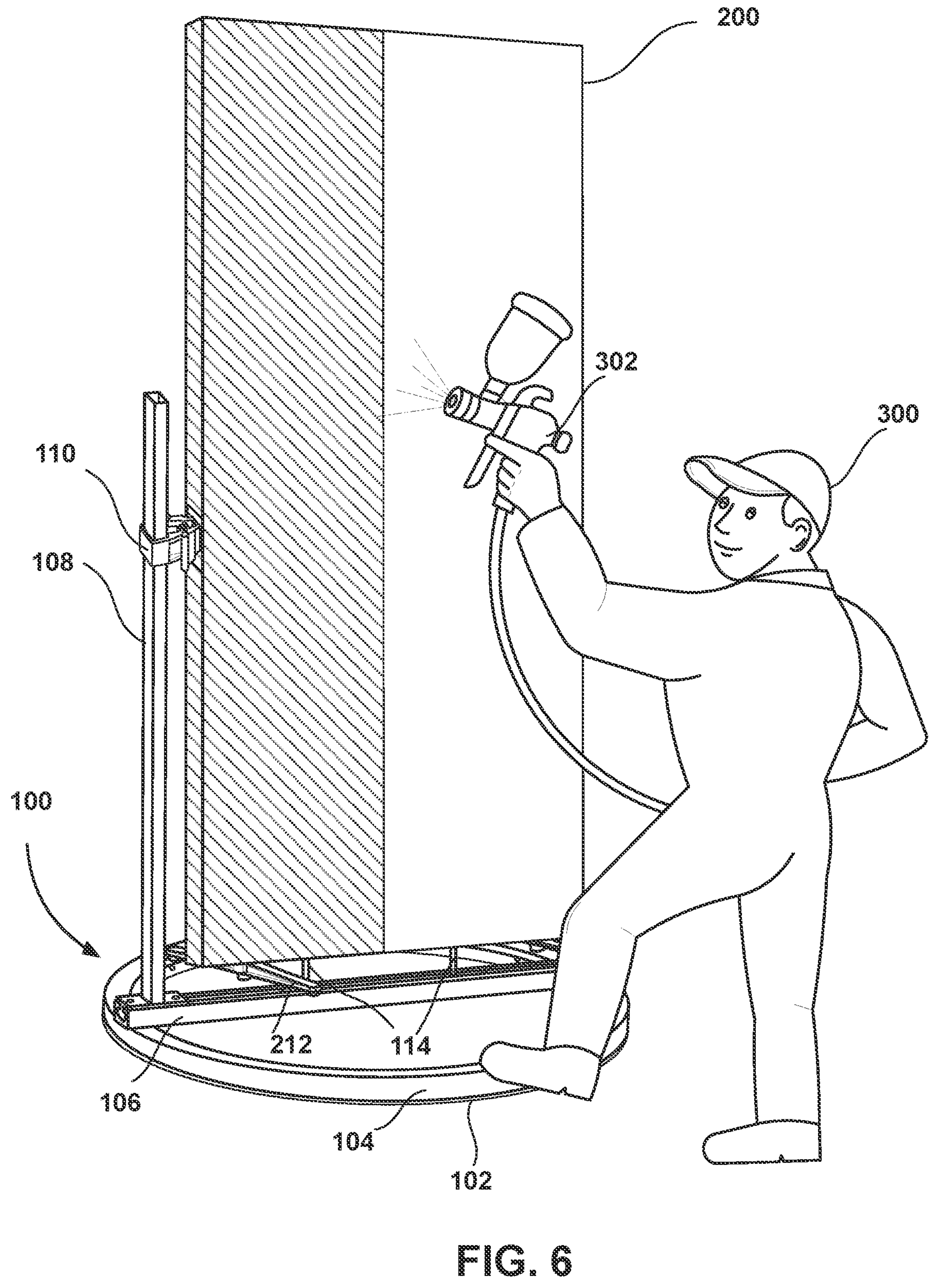
FIG. 6 is an in-use view of the door painting and drying assembly with the door getting painted by a painter.
Figure 7:
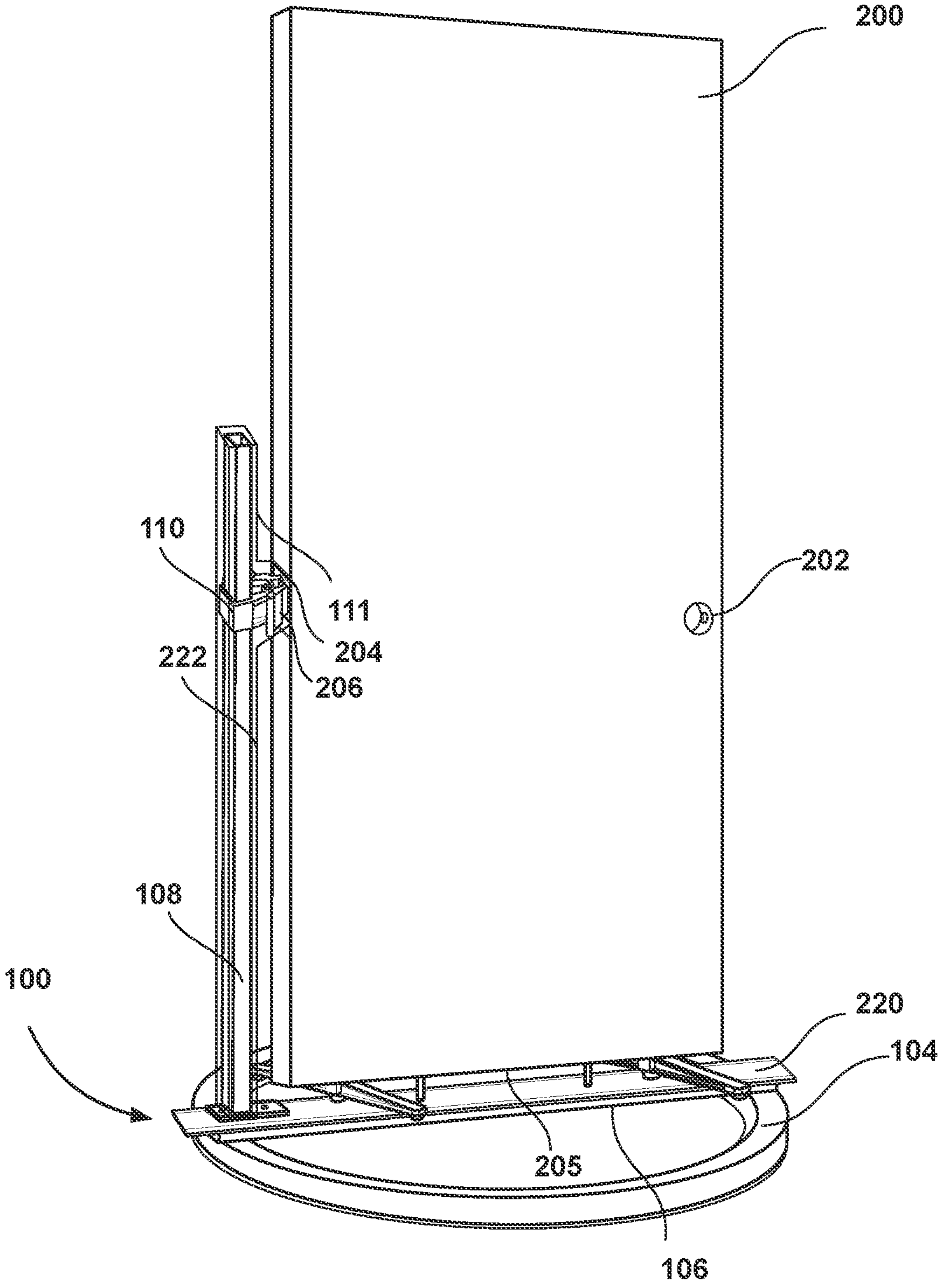
FIG. 7 is an in-use view of the door painting and drying assembly with paint shields to safeguard the assembly and the door getting finished from over-spraying of the paint.
Figure 8:
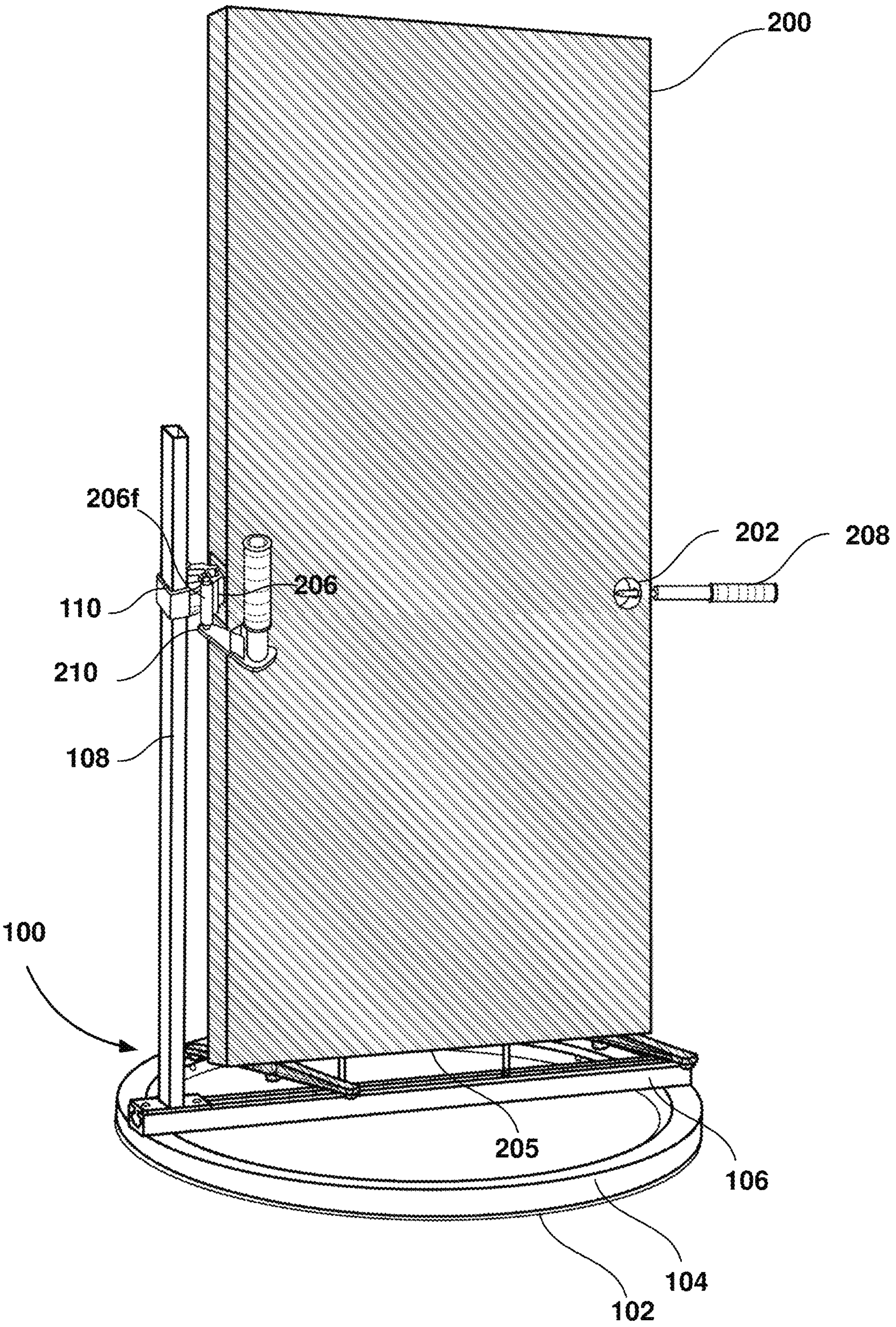
FIG. 8 is an in-use view of the door painting and drying assembly with a painted door and hand tools used to remove the door from the assembly without compromising the finish of the door.
Figure 9:
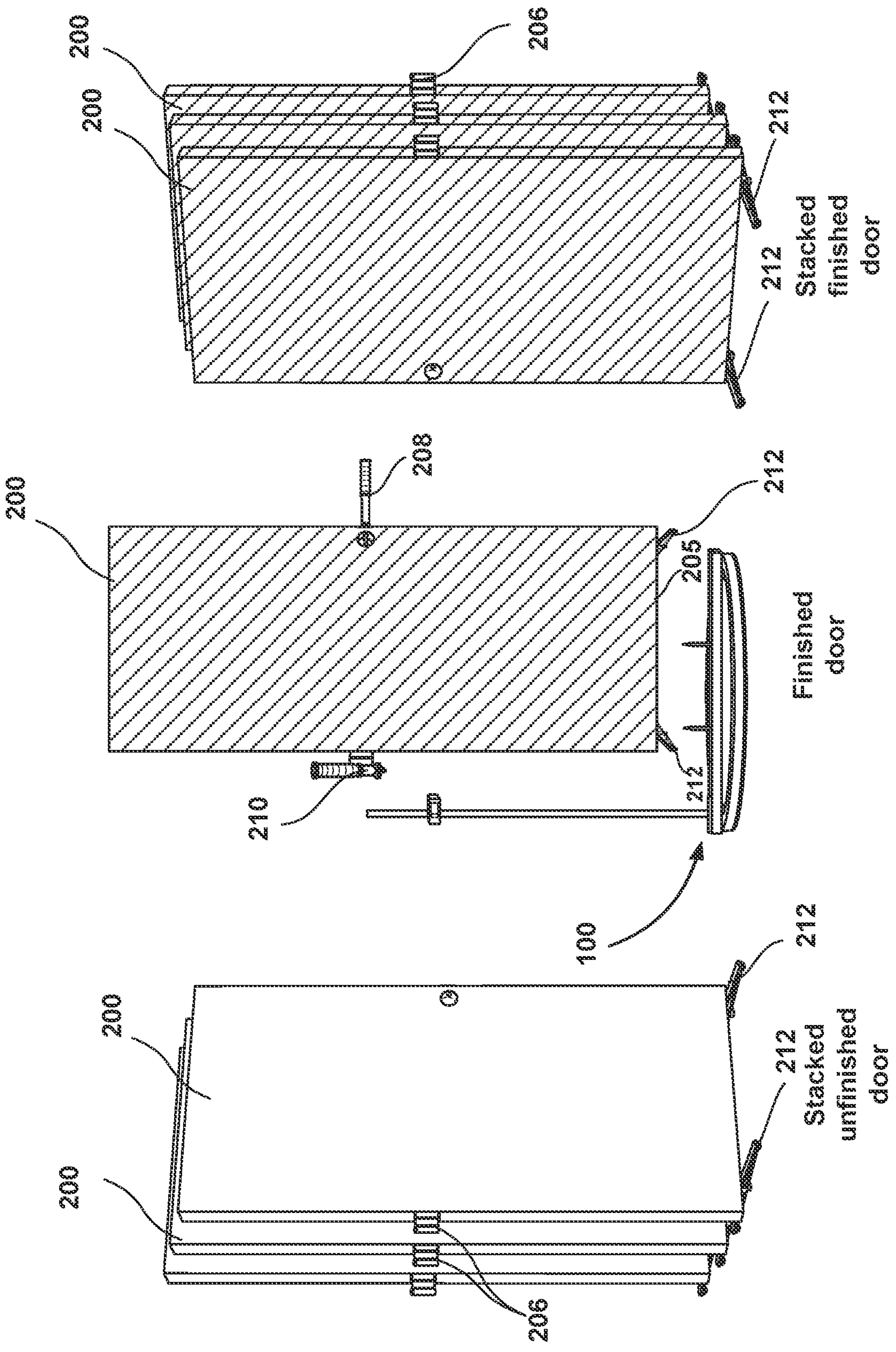
FIG. 9 shows a view of the door painting and drying assembly with a painted door being removed from the assembly and stacked with other finished doors.
Figure 10:
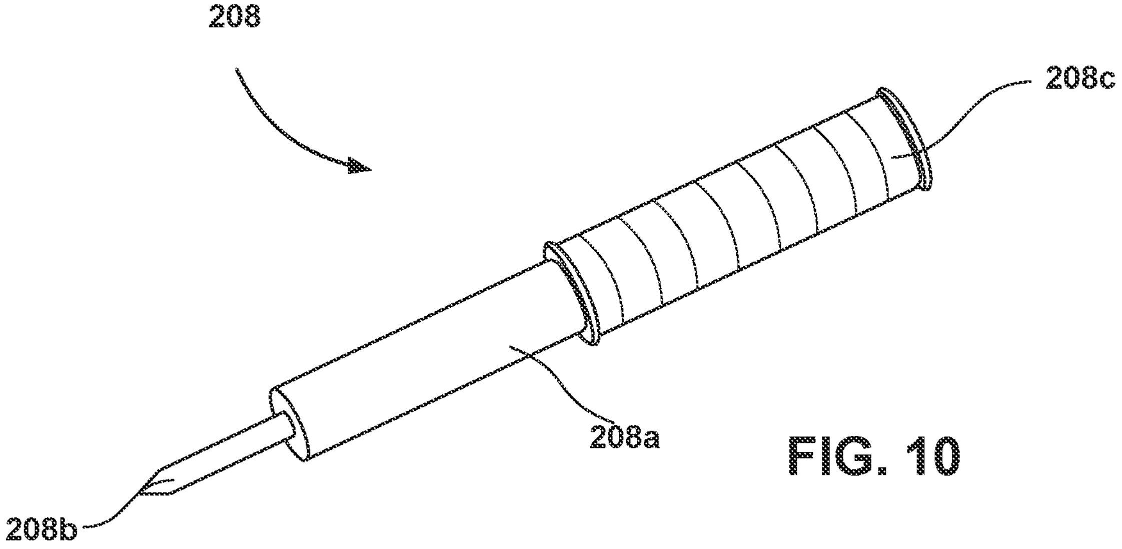
FIGS. 10-11 shows hand tools for use with the doors to mount or dismount the doors to and from the door painting and drying assembly.
Figure 11:
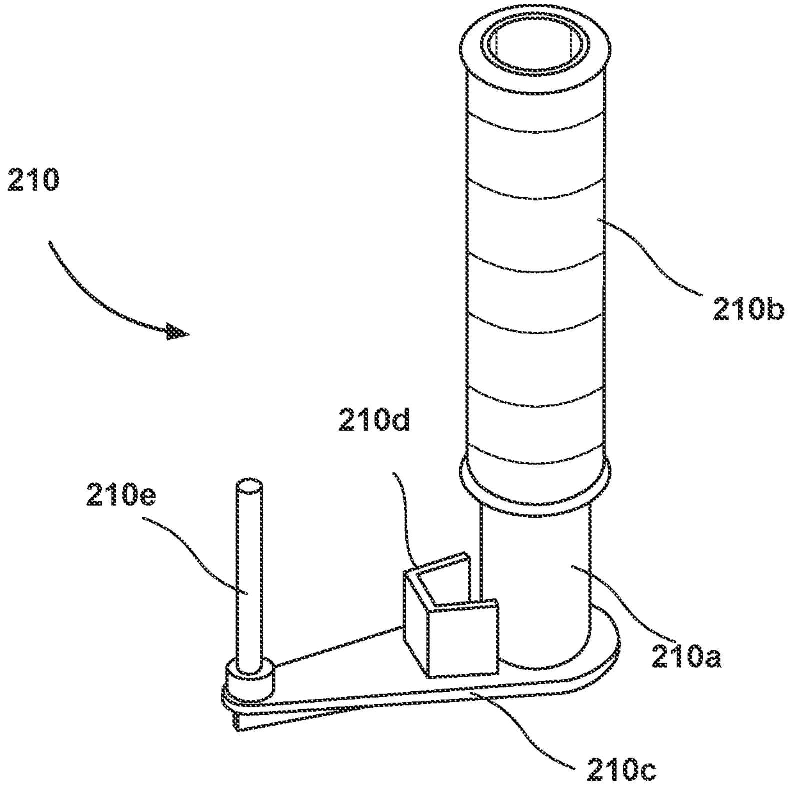
Figure 12:
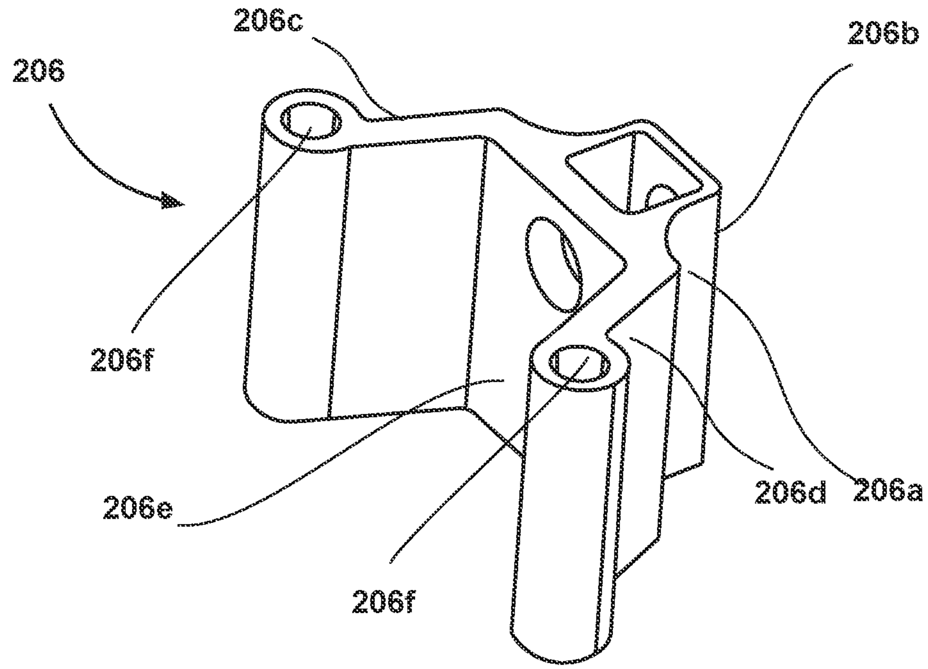
FIG. 12 shows a mount attachable on a hanging stile of the unfinished door for ease of mounting and dismounting the door to and from the door painting and drying assembly.
Figure 13:
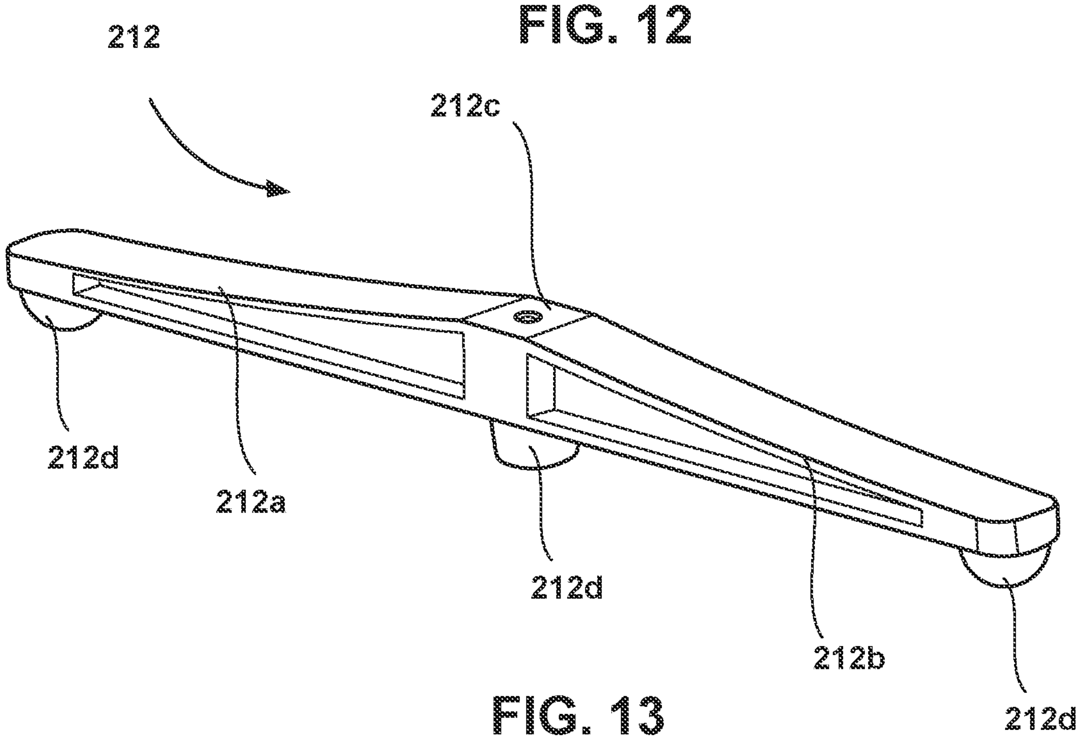
FIG. 13 shows a footrest on which the unfinished and finished doors usually stand whether or not they are on the door painting and drying assembly.

In operation, a painter or his coworker 300, first mounts the unfinished door 200 on the assembly 100. During the mounting process, the base portion 205 of the door 200 is placed over the door support member 114. The painter/user 300 then uses the paint spray gun 302 to paint the door 200. The painter 300 paints the surface facing the painter 200. Once the user 300 finishes spraying paint on the surface facing the painter 300, the user 300 then rotates the outer rim 104 using his leg. The upper rim 104 may be rotated in a clockwise or anticlockwise direction so as to flip the surface of the door 200 and paint the other side of the door 200 to complete the paint application process so that the complete door gets painted (FIGS. 6 and 8). Optionally, as shown in FIG. 7, the assembly 100 may use paint shields 220,222 (before application of the paint) that may cover the beam 106 and the vertical support member 108 respectively to safeguard the assembly 100 and the door 200 getting finished/painted from over-spraying of the paint. The paint shields 220,222 may be a plastic cover, a plastic sheet. The paint shield 220 or 222 may be made of any other suitable material. Next, once the unfinished door 200 (unpainted door 200) is painted, the door 200 may be left to dry or may be removed from the mount using hand held tools 208,210. In operation, as seen in FIGS. 8-9, the hand held tool 208 is inserted into the hole 202*a* configured on the closing stile of the finished door 200. Likewise, the vertical member 210*e* is inserted within an elongated hole 206 of the mount 206. Once both the hand held tools 208,210 are inserted into the door 200 and the mount 206, the user/painter 300 can hold the grip portions 208*c*,210*b* of the hand tools 208,210 and remove the finished door 200 from the assembly 100 and stacked with other finished doors.

Although particular embodiments of the invention have been described in detail for purposes of illustration, various modifications and enhancements may be made without departing from the spirit and scope of the invention.

What is claimed is:

1. A door painting and drying assembly (100), comprising:

(a) a base structure (101) comprising:
  an inner rim (102) having a first rim member (102*a*) and a second rim member (102*b*) oriented perpendicular to the first rim member (102*a*);
  an outer rim (104) having a third rim member (104*a*) and a fourth rim member (104*b*) oriented perpendicular to the third rim member (104*a*);
  wherein the outer rim (104) is rotatably configured over the inner rim (102) such that the outer rim (104) remains concentric with the inner rim (102) during rotation;

(b) a beam (106) attached across the fourth rim member (104*b*);

(c) a sliding member (112) slidably configurable on the beam (106), the sliding member (112) comprising at least two slots (112*c*) for receiving a door support member (114) there inside, wherein the door support member (114) supports a base portion (205) of a door (200); and (d) a vertical door support (108) with at least one bracket (110) adjustably mounted thereto, the at least one bracket (110) is configured to clamp to a mount (206) attached to a hanging stile of the door (200), wherein the mount (206) is attached for ease of mounting and dismounting the door (200) to and from the door painting and drying assembly (100).

2. The door painting and drying assembly (100) of claim 1, wherein the outer rim (104) when configured over the inner rim (102) forms a square cross-section or a rectangular cross-section.

3. The door painting and drying assembly (100) of claim 1 further comprising a plurality of rollers (102*c*) capable of freely rotating and configured on an interior surface of the second rim member (102*b*).

4. The door painting and drying assembly (100) of claim 3, wherein the plurality of rollers (102*c*) is configured on the interior surface of the second rim member (102*b*) using a plurality of fasteners (102*h*), and a plurality of locking pins (102*g*).

5. The door painting and drying assembly (100) of claim 4, wherein the plurality of fasteners (102*h*) extends through the plurality of rollers (102*c*) and through a plurality of fastener openings (102*e*) located on the interior surface of the second rim member (102*b*) to rotatably lock the plurality of rollers (102*c*) using the plurality of locking pins (102*g*).

6. The door painting and drying assembly (100) of claim 1 further comprising a plurality of spacers (102*d*) configured on the first rim member (102*a*) of the inner rim (102) to keep the outer rim (104) concentric with the inner rim (102) during rotation of the outer rim (104).

7. The door painting and drying assembly (100) of claim 6, wherein the plurality of spacers (102*d*) are configured on the first rim member (102*a*) of the inner rim (102) using a plurality of fasteners (102*i*) that extend through the plurality of spacers (102*d*) and a plurality of fastener openings (102*f*).

8. The door painting and drying assembly (100) of claim 1, wherein the beam (106) comprises:
  a base (106*a*);
  a first side wall (106*b*);
  a second side wall (106*c*); and
  wherein the base (106*a*), the first side wall (106*b*), and the second side wall (106*c*) extend longitudinally to form a channel (106*e*) for receiving the sliding member (112).

9. The door painting and drying assembly (100) of claim 8, wherein the beam (106) further comprises an opening on either side of the channel (106*e*).

10. The door painting and drying assembly (100) of claim 8, wherein the first side wall (106*b*) and the second side wall (106*c*) include an inwardly protruding extension (106*d*) to retain the sliding member (112) there inside and to slidingly insert and move the sliding member (112) within the channel (106*e*).

11. The door painting and drying assembly (100) of claim 1, wherein the sliding member (112 comprises base portion (112*a*), and a top portion (112*b*) extending upwardly from the base portion (112*a*).

12. The door painting and drying assembly (100) of claim 11, wherein the base portion (112*a*) of the sliding member (112) is made substantially similar in cross-section and size as that of the channel (106*e*) of the beam (106) to allow fitment and movement to the sliding member (112) within the channel (106*e*).

13. The door painting and drying assembly (100) of claim 1, wherein the door support member (114) comprises a pointed tip (114*a*) to support the base portion (205) of the door (200), and a threaded end (114*b*) to engage into the slots (112*c*) present on the sliding member (112).

14. The door painting and drying assembly (100) of claim 1, wherein the vertical door support (108) is removably or fixedly mounted onto the beam (106) using a mounting plate (109) located at the bottom of the vertical door support (108).

15. The door painting and drying assembly (100) of claim 14, wherein the vertical door support (108) is mounted at an extreme end of the beam (106).

16. The door painting and drying assembly (100) of claim 1, wherein the at least one bracket (110) is adjustable to slide upward or downward along the vertical door support (108) in order to align and clamp onto the amount (206) attached to the hanging stile of the door (200) depending upon a size of door (200).

17. The door painting and drying assembly (100) of claim 16, wherein the at least one bracket (110) includes a head portion (110*a*) substantially V-shaped, and a tail port (110*b*), the head portion (110*a*) is attachable to the mount (206) within a V-shaped cavity (206*e*) formed thereon surrounded by a pair of side supports (206*c*,206*d*) extending from an attaching portion (206*a*).

18. The door painting and drying assembly (100) of claim 17 further comprising:

a first hand tool (208) comprising a body portion (208*a*), a tip (208*b*) protruding from one end of the body portion (108*a*), and a hand grip portion (208*c*) extending from another end of the body portion (208*a*), wherein the tip (208*b*) and/or the body portion (208*a*) of the first hand tool (108) is insertable within a hole (202*a*) configured on a closing stile of the door (200) to facilitate mounting and dismounting of the door (200) to and from the door painting and drying assembly (100) using the first hand tool (208);

a second hand tool (210) comprising a body portion (210*a*), a hand grip portion (210*b*) extending from one end of the body portion (210*a*), a base plate (210*c*) attached to another end of the body portion (210*a*), the base plate (210*c*) having a V-shaped member (210*d*), and a vertical member (210*e*) configured thereon and extending upwardly therefrom, wherein the vertical member (210*e*) is insertable within an elongated hole (206*f*) formed at a free end of each of the pair of side supports (206*c*,206*d*) of the mount (206) to facilitate mounting and dismounting of the door (200) to and from the door painting and drying assembly (100) using the second hand tool (210).

19. The door painting and drying assembly (100) of claim 1 further comprising a footrest (212) including a first arm (212*a*), a second arm (212*b*) extending from a pivotal portion (212*c*), and a plurality of rubber pads (212*d*) attached thereto.

20. The door painting and drying assembly (100) of claim 19, wherein the footrest (212) is attachable to the base portion (205) of the door (200) to facilitate the door (200) to stand or a plurality of doors (200) to get stacked for drying or storage.

* * * * *